(12) United States Patent
Kim et al.

(10) Patent No.: US 9,310,650 B2
(45) Date of Patent: Apr. 12, 2016

(54) DISPLAY DEVICE AND METHOD OF MANUFACTURING THE SAME

(71) Applicant: Electronics and Telecommunications Research Institute, Daejeon (KR)

(72) Inventors: Gi Heon Kim, Daejeon (KR); Hojun Ryu, Seoul (KR); Won Jae Lee, Daejeon (KR); Yong Hae Kim, Daejeon (KR); Chul Am Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 94 days.

(21) Appl. No.: 14/283,692

(22) Filed: May 21, 2014

(65) Prior Publication Data

US 2015/0146153 A1    May 28, 2015

(30) Foreign Application Priority Data

Nov. 26, 2013    (KR) .......................... 10-2013-0144639

(51) Int. Cl.
*G02F 1/1339*    (2006.01)
*G02F 1/1333*    (2006.01)
*G02F 1/137*    (2006.01)

(52) U.S. Cl.
CPC ............. *G02F 1/1339* (2013.01); *G02F 1/1333* (2013.01); *G02F 1/13718* (2013.01); *G02F 1/133377* (2013.01); *G02F 2203/34* (2013.01)

(58) Field of Classification Search
None
See application file for complete search history.

(56) References Cited

U.S. PATENT DOCUMENTS

2012/0154900 A1    6/2012    Kim
2015/0077687 A1*   3/2015    Chiang ............. G02F 1/133512
                                                                349/110

FOREIGN PATENT DOCUMENTS

JP         2008-268566 A     11/2008
KR    10-2013-0041718 A      4/2013

OTHER PUBLICATIONS

Ko-Ting Cheng et al., "Optically Addressable Liquid Crystal Displays in Polymer-Dispersed Cholesteric Liquid Crystals", SID 09 DIGEST, pp. 1627-1629, Jun. 2009.
Kwang-Soo Bae et al., "Multi-Color Cholesteric Liquid Crystal Film by Fixing Helical Pitch with Reactive Mesogen", SID 10 DIGEST, pp. 1755-1757, May 2010.

* cited by examiner

*Primary Examiner* — Richard Kim
(74) *Attorney, Agent, or Firm* — Rabin & Berdo, P.C.

(57) ABSTRACT

Provided are a display device and a method of manufacturing the same. The display device includes a first substrate, a second substrate facing the first substrate and separated from the first substrate, a plurality of liquid crystal parts disposed between the first and second substrates, and separated in a horizontal direction from each other, spacers for separating the liquid crystal parts between the first and the second substrates, and immobilization patterns disposed in each of the liquid crystal parts, and including an optically active material.

4 Claims, 6 Drawing Sheets

DISPLAY DEVICE AND METHOD OF MANUFACTURING THE SAME

CROSS-REFERENCE TO RELATED APPLICATIONS

This U.S. non-provisional patent application claims priority under 35 U.S.C. §119 of Korean Patent Application No. 10-2013-0144639, filed on Nov. 26, 2013, the entire contents of which are hereby incorporated by reference.

BACKGROUND

The present disclosure herein relates to a display device and a method of manufacturing the same, and more particularly, to a display device including cholesteric liquid crystals and a method of manufacturing the same.

Generally, a liquid crystal display device is a display unit including two display substrates and a liquid crystal layer disposed therebetween. On each of the two substrates, an electrode is formed. A voltage is applied to the electrode to form an electric field. The transmittance of light passing through the liquid crystal layer may be controlled by controlling the electric field, and the liquid crystal display device may display a desired image.

Recently, a liquid crystal display device including a liquid crystal layer containing cholesteric liquid crystals, in which a polarization plate or a color filter is not necessary, is under development. Particularly, an application as an advertising panel, an e-book, etc. utilizing the selective reflection and the bi-stable behavior of the cholesteric liquid crystals has been suggested.

SUMMARY

The present disclosure provides a flat panel and light weight display device including cholesteric liquid crystals.

The present disclosure also provides a method of manufacturing the display device.

The tasks to be solved by the present inventive concept is not limited to the above-described tasks, however other tasks not mentioned will be precisely understood from the following description by a person skilled in the art.

Embodiments of the inventive concept provide display devices including a first substrate, a second substrate facing the first substrate and separated from the first substrate, a plurality of liquid crystal parts between the first and second substrates, and separated in a horizontal direction from each other, spacers for separating the liquid crystal parts between the first and the second substrates, and immobilization patterns in each of the liquid crystal parts, and including an optically active material.

In some embodiments, the liquid crystal part may include a first liquid crystal part including cholesteric liquid crystals selectively reflecting red color, a second liquid crystal part including cholesteric liquid crystals selectively reflecting green color, and a third liquid crystal part including cholesteric liquid crystals selectively reflecting blue color.

In other embodiments, the immobilization patterns may include a first immobilization pattern in the first liquid crystal part, and having a first volume, a second immobilization pattern in the second liquid crystal part, and having a second volume greater than the first volume, and a third immobilization pattern in the third liquid crystal part, and having a third volume greater than the second volume.

In still other embodiments, each of the immobilization patterns may include a polymer for immobilizing the optically active material.

In other embodiments of the inventive concept, methods of manufacturing a display device are provided. The methods include forming spacers on a first substrate to divide a top surface of the first substrate into a plurality of spaces, forming immobilization patterns including an optically active material and having different volumes in the spaces, respectively, injecting liquid crystals into each of the spaces in which each of the immobilization patterns is formed, melting the optically active material in the immobilization patterns to transform the liquid crystals into cholesteric liquid crystals to form each of liquid crystal parts, and disposing a second substrate on the liquid crystal parts.

In some embodiments, the forming of the immobilization patterns having different volumes may include forming a reactive compound including the optically active material, a reactive transparent monomer, and a photo-initiator, forming an immobilization layer by irradiating ultraviolet to the reactive compound, and etching the immobilization layer to form the immobilization patterns including a first immobilization pattern having a first volume, a second immobilization pattern having a second volume greater than the first volume, and a third immobilization pattern having a third volume greater than the second volume.

In other embodiments, the liquid crystals may include nematic liquid crystals, and the injecting of the liquid crystals may be performed by using one of a one drop filling (ODF) method, a vacuum injection method, and an injection method using capillary phenomenon at an atmospheric pressure.

In still other embodiments, the forming of the liquid crystal part by transforming the liquid crystals into the cholesteric liquid crystals by melting the optically active material of the immobilization patterns may include reacting the nematic liquid crystals with the melted optically active material to form the liquid crystal part including a first liquid crystal part selectively reflecting red color, a second liquid crystal part selectively reflecting green color, and a third liquid crystal part selectively reflecting blue color.

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION OF THE EMBODIMENTS

Figure 1:
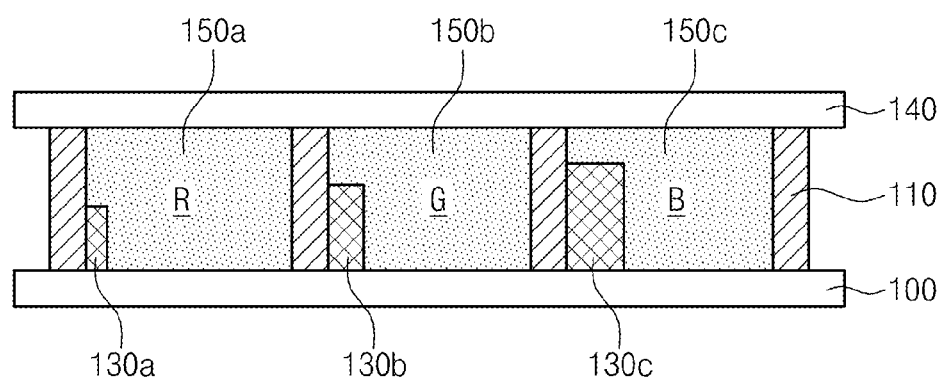
FIG. 1 is a cross-sectional view for explaining a display device according to an embodiment of the inventive concept.

The advantages and the features of the inventive concept, and methods for attaining them will be described in example embodiments below with reference to the accompanying drawings. The inventive concept may, however, be embodied in different forms and should not be construed as limited to the embodiments set forth herein. Rather, these embodiments are provided so that this description will be thorough and complete, and will fully convey the scope of the present inventive concept to those skilled in the art.

It will also be understood that when an element is referred to as being 'on' another element, it can be directly on the other element, or intervening elements may also be present. In the drawings, the thicknesses of elements may be exaggerated for effective explanation of technical contents.

Example embodiments are described herein with reference to cross-sectional views and/or plan views that are schematic illustrations of idealized example embodiments. In the drawings, the sizes and relative sizes of layers and regions may be exaggerated for effective explanation of technical contents. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, a region illustrated as a rectangle will, typically, have rounded or curved features. Thus, the regions illustrated in the figures are schematic in nature and their shapes are not intended to illustrate the actual shape of a region of a device and are not intended to limit the scope of the present inventive concept. It will be understood that, although the terms first, second etc. may be used herein to describe various elements, these elements should not be limited by these terms. These terms are only used to distinguish one element from another element. Example embodiments embodied and described herein may include complementary example embodiments thereof.

The terminology used herein is for the purpose of describing particular example embodiments only and is not intended to limit the present inventive concept. As used herein, the singular forms are intended to include the plural forms as well, unless the context clearly indicates otherwise. It will be further understood that the terms "comprises" and/or "comprising," when used in this specification, specify the presence of stated elements, but do not preclude the presence or addition of one or more other elements thereof.

Hereinafter, exemplary embodiments of the inventive concept will be described in detail with reference to the accompanying drawings.

FIG. 1 is a cross-sectional view for explaining a display device according to an embodiment of the inventive concept.

Referring to FIG. 1, a display device may include a first substrate 100, a second substrate 140, and a liquid crystal structure.

The first substrate 100 may include a transparent material. For example, the first substrate 100 may include glass, quartz and/or a synthetic resin. The first substrate 100 may include a first electrode (not shown). The first electrode may include a transparent conductive material. For example, the first electrode may include one among indium tin oxide (ITO) and indium zinc oxide (IZO). According to an aspect of the inventive concept, the first electrode may be provided as a pixel electrode, and the first electrode may be disposed in a unit pixel electrode.

The second substrate 140 may be disposed facing the first substrate 100 with a certain distance therebetween. The second substrate 140 may include a transparent material. For example, the second substrate 140 may include glass, quartz and/or a synthetic resin. The second substrate 140 may include a second electrode (not shown). The second electrode may include a transparent conductive material. For example, the second electrode may include one among ITO and IZO.

According to an aspect of the inventive concept, the second electrode may be provided as a common electrode.

The liquid crystal structure may be disposed between the first substrate 100 and the second substrate 140. The liquid crystal structure may include a liquid crystal part, spacers and an immobilization part.

The liquid crystal part may include cholesteric liquid crystals. The cholesteric liquid crystals may be formed by adding an optically active material into nematic liquid crystals. The cholesteric liquid crystals may have a helical structure with a certain period. The cholesteric liquid crystals may reflect a circularly polarized light component in the same direction as the rotational direction of the helical structure among incident lights parallel to the axis of the helical structure and may penetrate a circularly polarized light component in a counter direction, thereby having selective reflection properties. In this case, the central wavelength ($\lambda$) and the wavelength bandwidth ($\Delta\lambda$) of reflecting light may be represented by $\lambda = n \times p$, and $\Delta\lambda = \Delta n \times p$, respectively (n is mean refractive index of liquid crystals perpendicular to the helical axis, p is helical pitch, and $\Delta n$ is refractive anisotropy of liquid crystals).

The state of the cholesteric liquid crystals may be changed as a planar state, a focal conic state, and a homeotropic state according to the electric field between the first and second electrodes. The planar state of the cholesteric liquid crystals may be a state in which the helical axis of the cholesteric liquid crystals is perpendicular to the first substrate 100, the focal conic state of the cholesteric liquid crystals may be a state in which the helical axis is in parallel to the first substrate 100, and the homeotropic state of the cholesteric liquid crystals is a state in which the helical structure of the cholesteric liquid crystals is collapsed and liquid crystals are uniaxially aligned in the direction of the electric field. Selective reflection may occur in the planar state, diffused reflection may occur in the focal conic state, and light may penetrate in the homeotropic state. In the planar state and the focal conic state, bi-stable behavior may be obtained even though the electric field is not applied between the first and second substrates 100 and 140. Thus, a polarization plate and a color filter may not be necessary in a display device including the cholesteric liquid crystals.

The liquid crystal part including the cholesteric liquid crystals may display multi-color by using the selective reflection of the cholesteric liquid crystals. According to an embodiment of the inventive concept, the liquid crystal part may include a first liquid crystal part 150a, a second liquid crystal part 150b, and a third liquid crystal part 150c. In the inventive concept, the number of the liquid crystal parts is not limited thereto.

The first to third liquid crystal parts 150a, 150b and 150c may be separately disposed in a horizontal direction (that is, in a parallel direction to the top surface of the first substrate 100). According to an aspect of the inventive concept, the first liquid crystal part 150a may selectively reflect the wavelength of red color among irradiated lights to display red color. The second liquid crystal part 150b may selectively reflect the wavelength of green color among the irradiated lights to display green color. The third liquid crystal part 150c may selectively reflect the wavelength of blue color among the irradiated lights to display blue color.

The spacers 110 may be disposed between the first to third liquid crystal parts 150a, 150b and 150c and may separate the first to third liquid crystal parts 150a, 150b and 150c from each other. In the defined spaces by neighboring spacers 110, each of the first to third liquid crystal parts 150a, 150b and 150c may be disposed. The spacers 110 may include a transparent and fixed polymer. Examples on the polymer will be described in detail herein below.

According to an aspect of the inventive concept, the first to third liquid crystal parts 150a, 150b and 150c may be disposed in one pixel. The first to third liquid crystal parts 150a, 150b and 150c respectively may function as sub-pixels.

The immobilization part may be disposed in the first to third liquid crystal parts 150a, 150b and 150c. According to an embodiment of the inventive concept, the immobilization part may be disposed adjacent to the spacers 110, however the position of the immobilization part is not limited thereto.

According to an embodiment of the inventive concept, the immobilization part may include a transparent polymer containing an optically active material. The immobilization part may be melted at the melting point of the optically active material. For example, the immobilization part may be melted at from about 40° C. to about 110° C.

In this embodiment, the immobilization part may include a first immobilization pattern 130a, a second immobilization pattern 130b and a third immobilization pattern 130c. The number of the immobilization parts in the inventive concept is not limited thereto. According to an aspect, the first immobilization pattern 130a may be disposed in the first liquid crystal part 150a, the second immobilization pattern 130b may be disposed in the second liquid crystal part 150b, and the third immobilization pattern 130c may be disposed in the third liquid crystal part 150c.

The volumes of the first to third immobilization patterns 130a, 130b and 130c may be different from each other. The first immobilization pattern 130a of the first liquid crystal part 150a displaying red color may have a first volume, the second immobilization pattern 130b of the second liquid crystal part 150b displaying green color may have a second volume, and the third immobilization pattern 130c of the third liquid crystal part 150c displaying blue color may have a third volume. The first volume may be smaller than the second and third volumes, and the second volume may be smaller than the third volume. As the volumes of the first to third immobilization patterns 130a, 130b and 130c increase, the amount of the optically active material increases. According to the amount of the optically active material, the color of the first to third liquid crystal parts 150a, 150b and 150c may be determined.

Since the color of the sub-pixels may be divided according to the amount of the immobilization part, the decrease of power consumption may be possible. In addition, since the sub-pixels may be separated in the horizontal direction, a flat panel and light weight display device may be manufactured.

FIGS. 2A through 2H are cross-sectional views for explaining a method of manufacturing a display device according to an embodiment of the inventive concept.

Figure 2A:
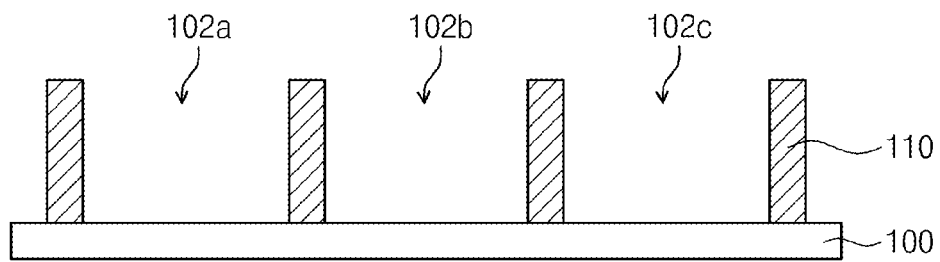
FIGS. 2A through 2H are cross-sectional views for explaining a method of manufacturing a display device according to an embodiment of the inventive concept.

Referring to FIG. 2A, spacers 110 may be formed on a first substrate 100.

Particularly, a spacer layer (not shown) may be formed on the first substrate 100. The spacer layer may be formed by using a solution including a transparent monomer and a photo-initiator.

The transparent monomer may include one among an acryl-based, an acrylonitrile-based, and a chloride-based monomer.

The acryl-based monomer may include triethylpropane triacrylate (TMPTA), tri(propylene glycol) diacrylate (TPGDA), pentaerythritol triacrylate (PETA), trimethylolpropane ethoxylate triacrylate (TMPEOTA), methyl methacrylate (MMA), methacrylate (MA), tri(propylene glycol) glycerolate diacrylate (TPGGDA), vinylacrylate (VA), and an aromatic monomer such as styrene (ST) and divinyl benzene (DVB). The acrylonitrile-based (AN-based) monomer may include acrylonitrile (AN). The chloride-based (Cl-based) monomer may include vinylidene chloride (VDC), vinylbenzyl chloride (VBC), vinyl stearate (VS), vinyl propionate (VP), vinyl acetate, vinyl pyrrolidone, and vinyl phenol. A mixture material of the above-described monomers may be used.

The photo-initiator may include at least one selected from the group consisting of 1-hydroxy-cyclohexyl-phenyl-ketone (Irgacure 907), 2-methyl-1-[4-(methylthio)phenyl]-2-morpholinopropane-1-one (Irgacure 184C), 2-hydroxy-2-methyl-1-phenyl-propane-1-one (Darocur 1173), an initiator (Irgacure 500C) obtained by mixing about 50 wt % of Irgacure 184C and about 50 wt % of benzophenone, an initiator (Irgacure 1000) obtained by mixing about 20 wt % of Irgacure 184 and about 80 wt % of Irgacure 1173, 2-hydroxy-1-[4-(2-hydroxyethoxy)phenyl]-2-methyl-1-propanone (Irgacure 2959), methylbenzoylformate (Darocur MBF), alpha, alpha-dimethoxy-alpha-phenylacetophenone (Irgacure 651), 2-benzyl-2-(dimethylamino)-1-[4-(4-morpholinyl)phenyl]-1-butanone (Irgacure 369), an initiator (Irgacure 1300) obtained by mixing about 30 wt % of Irgacure 369 and about 70 wt % of Irgacure 651, diphenyl (2,4,6-trimethylbenzoyl)-phosphine oxide (Darocur TPO), an initiator (Darocur 4265) obtained by mixing about 50 wt % of Darocur TPO and about 50 wt % of Darocur 1173, phosphine oxide, phenyl bis(2,4,6-trimethyl benzoyl (Irgacure 819), an initiator (Irgacure 2005) obtained by mixing about 5 wt % of Irgacure 819 and about 95 wt % of Darocur 1173, an initiator (Irgacure 2010) obtained by mixing about 10 wt % of Irgacure 819 and about 90 wt % of Darocur 1173, an initiator (Irgacure 2020) obtained by mixing about 20 wt % of Irgacure 819 and about 80 wt % of Darocur 1173, bis(.eta.5-2,4-cyclopentadiene-1-yl) bis[2,6-difluoro-3-[1H-pyrrol-1-yl]phenyl]titanium (Irgacure 784), and a mixture initiator (HSP 188) containing benzophenone.

The transparent monomer and the photo-initiator have a cured polymer state and may form a spacer layer. The light may be ultraviolet light or visible light. The spacer layer may be etched to form transparent spacers 110.

The first substrate 100 may be divided into a plurality of spaces 102a, 102b and 102c by the spacers 110. In this embodiment, the first substrate 100 is illustrated as being divided into three spaces 102a, 102b and 102c by the spacers 110, however the inventive concept is not limited thereto. For convenience of explanation, three spaces 102a, 102b and 102c may be designated as a first space 102a, a second space 102b and a third space 102c, respectively, herein below.

Figure 2B:
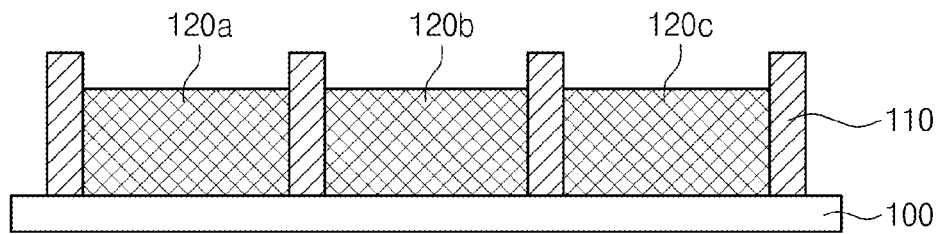

Referring to FIG. 2B, an immobilization layer 120 may be formed in the first to third spaces 102a, 102b and 102c on the first substrate 100.

More particularly, a reactive compound (not shown) may be obtained by mixing an optically active material, a photo-initiator, and a reactive transparent monomer. Hereinafter examples of the constituent materials of the reactive compound will be described in detail.

The reactive compound may be coated on the first substrate 100 and ultraviolet (UV) may be irradiated thereto. The irradiating intensity of the ultraviolet may be appropriately controlled depending on the kind of the photo-initiator, the height of a transparent polymer pattern, etc. For example, the irradiating intensity of the ultraviolet may be in the range of from about 1 mW/cm$^2$ to about 2,000 mW/cm$^2$. In addition, the formation of color sub-pixels having a plurality of selective reflection wavelengths by irradiating light one time may be possible. In another embodiment, the damage on an organic material may be minimized by using visible light as a light source.

According to an aspect, the optically active material of the reactive compound may be immobilized in the reactive transparent polymer by the light such as ultraviolet to form an immobilization layer 120.

For convenience of explanation, the formation of a first immobilization layer 120a in the first space 102a, the formation of a second immobilization layer 120b in the second space 102b, and the formation of a third immobilization layer 120c in the third space 102c will be explained.

Figure 2C:
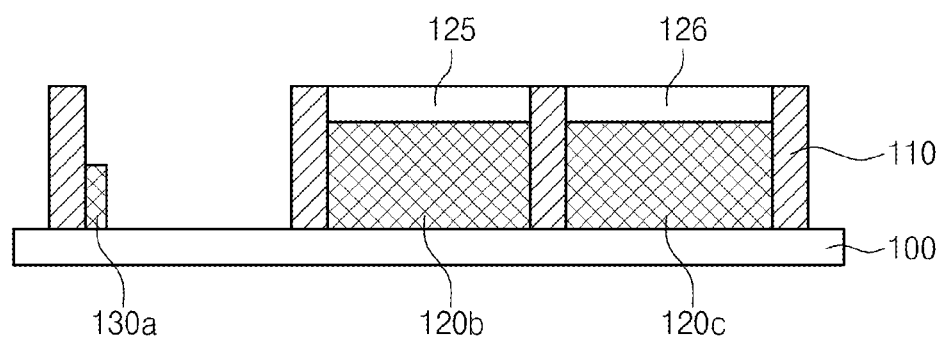
Figure 2D:
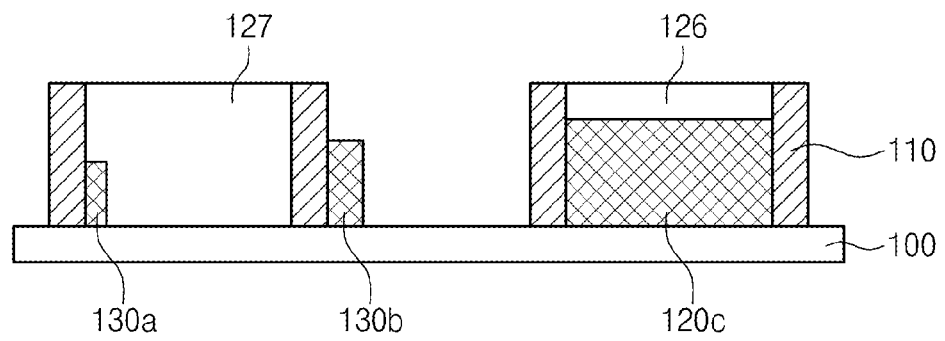
Figure 2E:
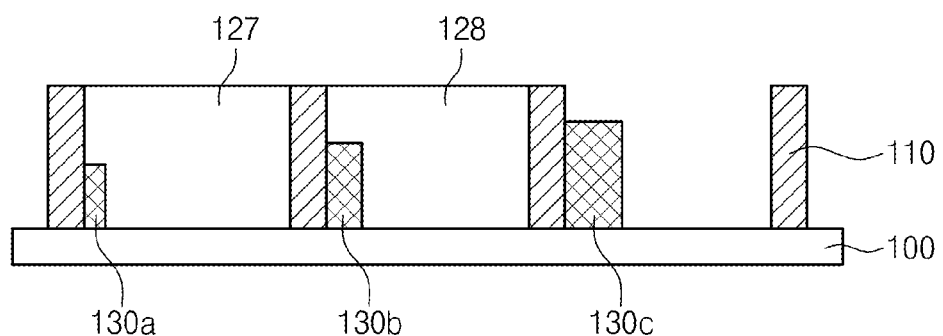

Referring to FIGS. 2C, 2D and 2E, first to third immobilization patterns 130a, 130b and 130c may be formed by etching the first to third immobilization layers 120a, 120b and 120c.

According to an embodiment of the inventive concept, the volumes of the first to third immobilization patterns 130a, 130b and 130c may be different from each other. According to an aspect, the volume may gradually increase from the first immobilization pattern 130a to the second immobilization pattern 130b and the third immobilization pattern 130c. The amount of the optically active material may be controlled by the volumes of the first to third immobilization patterns 130a, 130b and 130c. That is, the concentration of the optically active material in the first immobilization pattern 130a having the smallest volume may be the lowest, and the concentration of the optically active material in the third immobilization pattern 130c having the greatest volume may be the highest. In an embodiment of the inventive concept, the concentration of the optically active material in the first to third immobilization patterns 130a, 130b and 130c may be from about 0.1 wt % to about 40 wt %.

According to an aspect, the first to third immobilization patterns 130a, 130b and 130c may be formed at a position corresponding to a thin film transistor (TFT, not shown) or a wiring (not shown) to maximize selective reflection efficiency.

A forming process of the first to third immobilization patterns 130a, 130b and 130c according to this embodiment will be explained more particularly.

Referring to FIG. 2C, mask patterns 125 and 126 covering the second and third immobilization layers 120b and 120c are formed, and a first etching is performed with respect to the first immobilization layer 120a to form the first immobilization pattern 130a. For example, the first etching may be a wet etching.

After performing the etching process, the mask pattern 125 on the second immobilization layer 102b may be removed.

Referring to FIG. 2D, mask patterns 126 and 127 covering the first immobilization pattern 130a and the third immobilization layer 120c are formed, and a second etching is performed with respect to the second immobilization layer 120b to form the second immobilization pattern 130b. For example, the second etching may be a wet etching. The etching degree of the second etching may be smaller than that of the first etching. Thus, the volume of the second immobilization pattern 130b may be greater than the volume of the first immobilization pattern 130a.

After performing the etching process, the mask pattern 126 on the third immobilization layer 102c may be removed.

Referring to FIG. 2E, mask patterns 127 and 128 covering the first immobilization pattern 130a and the second immobilization pattern 130b are formed, and a third etching is performed with respect to the third immobilization layer 120c to form the third immobilization pattern 130c. For example, the third etching may be a wet etching. The etching degree of the third etching may be smaller than that of the second etching. Thus, the volume of the third immobilization pattern 130c may be greater than the volume of the second immobilization pattern 130b.

After performing the etching process, the mask patterns 127 and 128 may be removed.

Figure 2F:
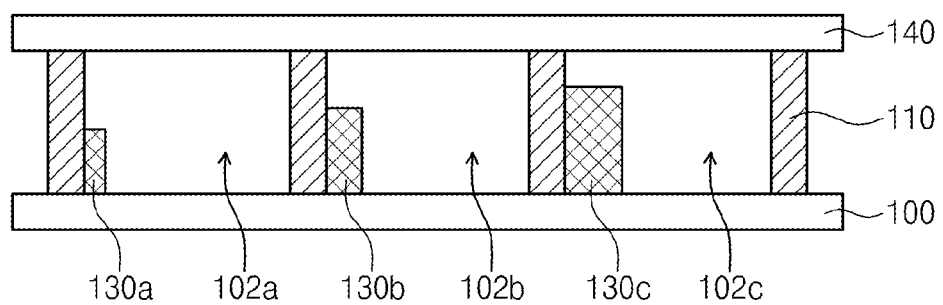

Referring to FIG. 2F, a second substrate 140 may be disposed on the spacers 110. The second substrate 140 may face the first substrate 100, and may be disposed with a distance from the first substrate 100 by the spacers 110.

Figure 2G:
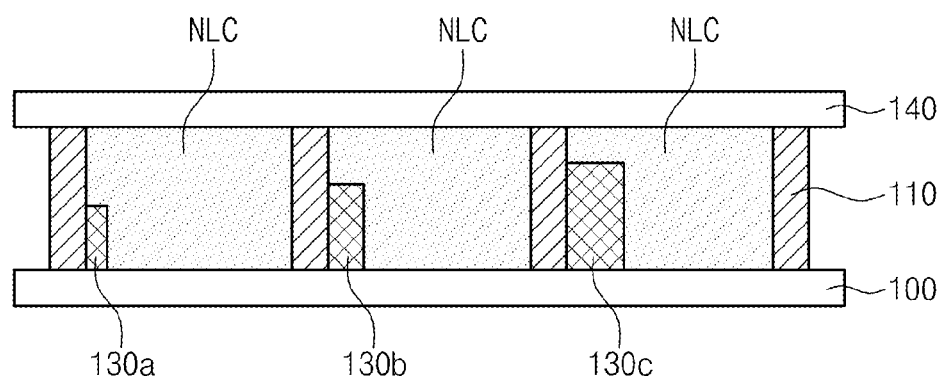

Referring to FIG. 2G, into the first to third spaces 102a, 102b and 103c in which the first to third immobilization patterns 130a, 130b and 130c are respectively formed, liquid crystals NLC may be injected.

According to an aspect of the inventive concept, the liquid crystals NLC may include nematic liquid crystals. The nematic liquid crystals may include at least one selected from the group consisting of biphenyl-based, phenyl cyclohexyl-based, terphenyl-based, tran-based, pyrimidine-based, and stilbene liquid crystals. These materials may be used alone or a combination of two or more may be used. The nematic transition temperature ($T_{NI}$) of the liquid crystals NLC may be preferably high, and may be in the range of from about 40° C. to about 150° C.

The injecting process of the liquid crystals NLC into the first to third spaces 102a, 102b and 102c may include one of a one drop filling (ODF) method, a vacuum injection method, an injection method using capillary phenomenon at the atmospheric pressure.

Figure 2H:
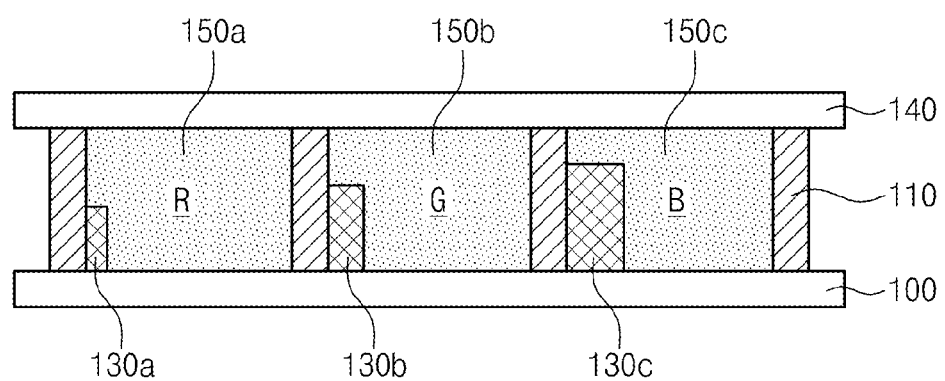

Referring to FIG. 2H, the first to third immobilization patterns 130a, 130b and 130c may be melted to form first to third liquid crystal parts 150a, 150b and 150c selectively reflecting different wavelengths.

More particularly, a heating process may be performed at a temperature of at least the melting point of the optically active material in the first to third immobilization patterns 130a, 130b and 130c. According to an aspect, the melting point may be in the range of from about 40° C. to about 110° C. Through the heating process, the optically active material in the first to third immobilization patterns 130a, 130b and 130c may be melted and dispersed into the liquid crystals NLC, thereby transforming the liquid crystals into cholesteric liquid crystals having selective reflection wavelength. As described above, the selective reflection wavelengths of the finally obtained cholesteric liquid crystals may be different because the amounts of the optically active materials in the first to third immobilization patterns 130a, 130b and 130c are different. According to an embodiment of the inventive concept, the first liquid crystal part 150a may selectively reflect red color, the second liquid crystal part 150b may selectively reflect green color, and the third liquid crystal part 150c may selectively reflect blue color.

Figure 3A:
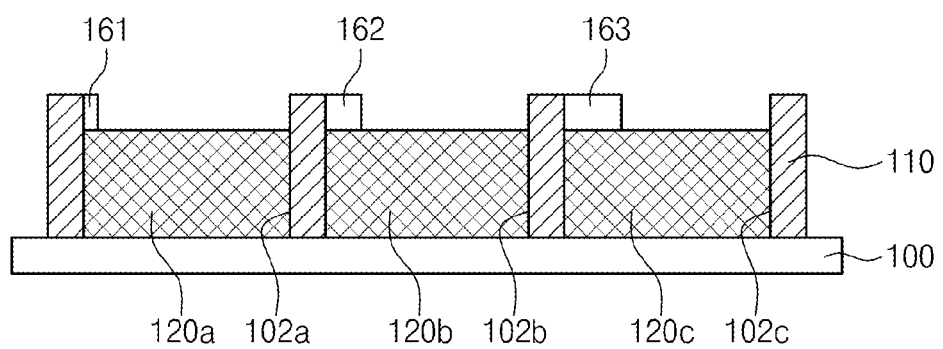
FIGS. 3A and 3B are cross-sectional views for explaining a method of manufacturing a display device according to another embodiment of the inventive concept.
Figure 3B:
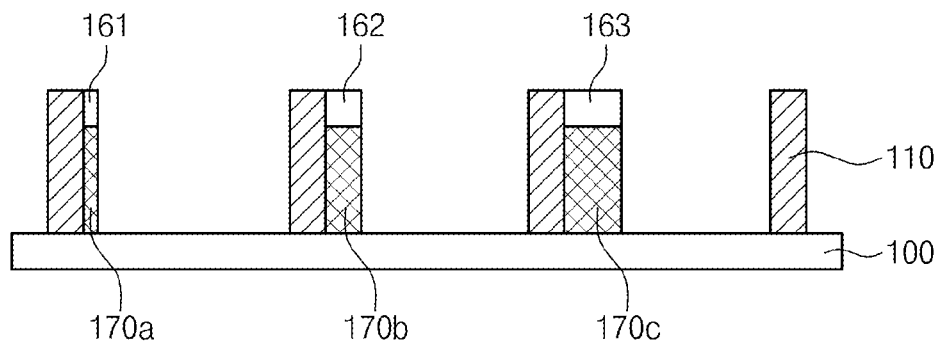

FIGS. 3A and 3B are cross-sectional views for explaining a method of manufacturing a display device according to another embodiment of the inventive concept.

Referring to FIG. 3A, first to third immobilization layers 120a, 120b and 120c may be formed in first to third spaces 102a, 102b and 102c separated by spacers 110. Since each of the forming processes of the first to third immobilization layers 120a, 120b and 120c in the first to third spaces 102a, 102b and 102c is substantially the same as that explained in FIGS. 2A and 2B, detailed description thereabout will be omitted.

A first mask pattern 161 having a first width may be formed on the first immobilization layer 120a, a second mask pattern 162 having a second width greater than the first width may be formed on the second immobilization layer 120b, and a third mask pattern 163 having a third width greater than the second width may be formed on the third immobilization layer 120c.

Referring to FIG. 3B, first to third immobilization patterns 170a, 170b and 170c may be formed by etching the first to third immobilization layers 120a, 120b and 120c using the first to third mask patterns 161, 162 and 163 as etching masks.

The first immobilization pattern 170a may have a first width, the second immobilization pattern 170b may have a second width greater than the first width, and the third immobilization pattern 170c may have a third width greater than the second width. In this case, the height of the top surfaces of the first to third immobilization patterns 170a, 170b and 170c may be substantially the same.

Subsequent processes are substantially the same as those explained referring to FIGS. 2F to 2H, and detailed description thereabout will be omitted.

Hereinafter examples of the constituent materials of the immobilization layer explained in FIG. 2B will be described. However the inventive concept is not limited thereto.

The immobilization layer may include an optically active material, a reactive transparent monomer and a photo-initiator.

The optically active material is represented by the following Formula 1.

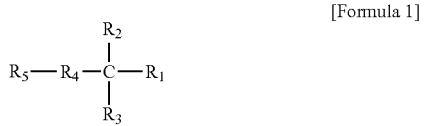

[Formula 1]

$R_1$ may include H, $CH_3$, and $C_2H_5$, $R_2$ may be an aromatic group or (and) a cycloaliphatic group including $C_6H_{13}$ or OCO, and $R_3$ may include H, $CH_3$, $C_2H_5$, and Ar. $R_1$, $R_2$ and $R_3$ may form an asymmetric structure with C* as a center. $R_4$ may be O, CONH, COO, CN, and OCO, $R_5$ may be X—B-A-, in which A may be a replaceable aromatic group or a cycloaliphatic group, B may be a replaceable aromatic group or a cycloaliphatic group, and A and B may have different structures or may have repeating structures. $R_4$ may be positioned between B and A of $R_5$. X may have a $C_2$-$C_7$ aliphatic structure. In some cases, X may have a $C_2$-$C_7$ branch structure.

The aromatic group of the optically active material may include, without specific limitation, a benzene ring such as a phenyl group, etc.; a condensed ring such as a naphthyl group, an anthryl group, a phenanthryl group, etc.; a residual group of a heteroaromatic ring; and a combination thereof. Substituent may include, without specific limitation, a methyl group ($CH_3$), an ethyl group ($C_2H_5$), an n-propyl group (n-$C_3H_7$), F, Cl, Br, $CF_3$, $CCl_3$, etc.

The reactive transparent monomer for immobilizing the optically active material may include one among an acryl-based, an acrylonitrile-based, and a chloride-based monomer.

The acryl-based monomer may include TMPTA, TPGDA, PETA, TMPEOTA, MMA, MA, TPGGDA, VA, and an aromatic monomer such as ST and DVB. The AN-based monomer may include AN. The Cl-based monomer may include VDC, VBC, VS, VP, vinyl acetate, vinyl pyrrolidone, and vinyl phenol. A mixture material of the above-described monomers may be used.

The photo-initiator may include at least one selected from the group consisting of 1-hydroxy-cyclohexyl-phenyl-ketone (Irgacure 907), 2-methyl-1-[4-(methylthio)phenyl]-2-morpholinopropane-1-one (Irgacure 184C), 2-hydroxy-2-methyl-1-phenyl-propane-1-one (Darocur 1173), an initiator (Irgacure 500C) obtained by mixing about 50 wt % of Irgacure 184C and about 50 wt % of benzophenone, an initiator (Irgacure 1000) obtained by mixing about 20 wt % of Irgacure 184 and about 80 wt % of Irgacure 1173, 2-hydroxy-1-[4-(2-hydroxyethoxyl)phenyl]-2-methyl-1-propanone (Irgacure 2959), methylbenzoylformate (Darocur MBF), alpha, alpha-dimethoxy-alpha-phenylacetophenone (Irgacure 651), 2-benzyl-2-(dimethylamino)-1-[4-(4-morpholinyl)phenyl]-1-butanone (Irgacure 369), an initiator (Irgacure 1300) obtained by mixing about 30 wt % of Irgacure 369 and about 70 wt % of Irgacure 651, diphenyl (2,4,6-trimethylbenzoyl)-phosphine oxide (Darocur TPO), an initiator (Darocur 4265) obtained by mixing about 50 wt % of Darocur TPO and about 50 wt % of Darocur 1173, phosphine oxide, phenyl bis(2,4,6-trimethyl benzoyl (Irgacure 819), an initiator (Irgacure 2005) obtained by mixing about 5 wt % of Irgacure 819 and about 95 wt % of Darocur 1173, an initiator (Irgacure 2010) obtained by mixing about 10 wt % of Irgacure 819 and about 90 wt % of Darocur 1173, an initiator (Irgacure 2020) obtained by mixing about 20 wt % of Irgacure 819 and about 80 wt % of Darocur 1173, bis(.eta.5-2,4-cyclopentadiene-1-yl) bis[2,6-difluoro-3-[1H-pyrrol-1-yl]phenyl]titanium (Irgacure 784), and a mixture initiator (HSP 188) containing benzophenone.

According to the embodiments of the inventive concept, a flat panel and light weight display device in which first to third liquid crystal parts separated from each other in a horizontal direction and functioning as sub-pixels may be provided. In addition, through selecting reflection wavelengths according to the amount of an optically active material in the first to third liquid crystal parts, a low power display device may be provided.

The above-disclosed subject matter is to be considered illustrative and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A method of manufacturing a display device, the method comprising:
   forming spacers on a first substrate to divide a top surface of the first substrate into a plurality of spaces;
   forming immobilization patterns including an optically active material and having different volumes in the spaces, respectively;
   injecting liquid crystals into each of the spaces in which each of the immobilization patterns is formed;
   melting the optically active material in the immobilization patterns to transform the liquid crystals into cholesteric liquid crystals to form each of liquid crystal parts; and
   disposing a second substrate on the liquid crystal parts.

2. The method of manufacturing a display device of claim 1, wherein the forming of the immobilization patterns having different volumes comprises:
   forming a reactive compound including the optically active material, a reactive transparent monomer, and a photo-initiator;
   forming an immobilization layer by irradiating ultraviolet to the reactive compound; and
   etching the immobilization layer to form the immobilization patterns including a first immobilization pattern having a first volume, a second immobilization pattern having a second volume greater than the first volume, and a third immobilization pattern having a third volume greater than the second volume.

3. The method of manufacturing a display device of claim 1, wherein the liquid crystals include nematic liquid crystals, and the injecting of the liquid crystals is performed by using one of a one drop filling (ODF) method, a vacuum injection method, and an injection method using capillary phenomenon at an atmospheric pressure.

4. The method of manufacturing a display device of claim 3, wherein the forming of the liquid crystal part by transforming the liquid crystals into the cholesteric liquid crystals by melting the optically active material of the immobilization patterns comprises:

reacting the nematic liquid crystals with the melted optically active material to form the liquid crystal part comprising a first liquid crystal part selectively reflecting red color, a second liquid crystal part selectively reflecting green color, and a third liquid crystal part selectively reflecting blue color.

\* \* \* \* \*